(12) United States Patent
Black et al.

(10) Patent No.: US 8,239,523 B1
(45) Date of Patent: Aug. 7, 2012

(54) SECURE REMOTE ACCESS

(75) Inventors: Rodney Black, Louisville, CO (US);
Larry J. Shaffer, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 668 days.

(21) Appl. No.: 12/017,660

(22) Filed: Jan. 22, 2008

(51) Int. Cl.
*G06F 15/173* (2006.01)

(52) U.S. Cl. .................................... 709/224

(58) Field of Classification Search .............. 709/224
See application file for complete search history.

(56) References Cited

U.S. PATENT DOCUMENTS

| | | | |
|---|---|---|---|
| 6,584,432 B1* | 6/2003 | Holzinger et al. | 702/188 |
| 6,651,190 B1* | 11/2003 | Worley et al. | 714/43 |
| 2004/0117310 A1* | 6/2004 | Mendez et al. | 705/50 |
| 2007/0022218 A1* | 1/2007 | Szolyga et al. | 709/250 |
| 2007/0055752 A1* | 3/2007 | Wiegand et al. | 709/220 |
| 2007/0067623 A1* | 3/2007 | Ward | 713/164 |

FOREIGN PATENT DOCUMENTS

EP    1187438 A1    3/2002

OTHER PUBLICATIONS

Intel, "IP Security: Building Block for the Trusted Virtual Network", 1999, pp. 8, Intel Corporation.

* cited by examiner

*Primary Examiner* — Joseph Avellino
*Assistant Examiner* — James Conaway
(74) *Attorney, Agent, or Firm* — Sheridan Ross P.C.

(57) ABSTRACT

A remote maintenance board (RMB) that interfaces a monitored system with a communications network is either functionally connected to the monitored system or to the communications network, but never to both at the same time, thereby isolating the monitored system from unauthorized access via the communications network.

13 Claims, 2 Drawing Sheets

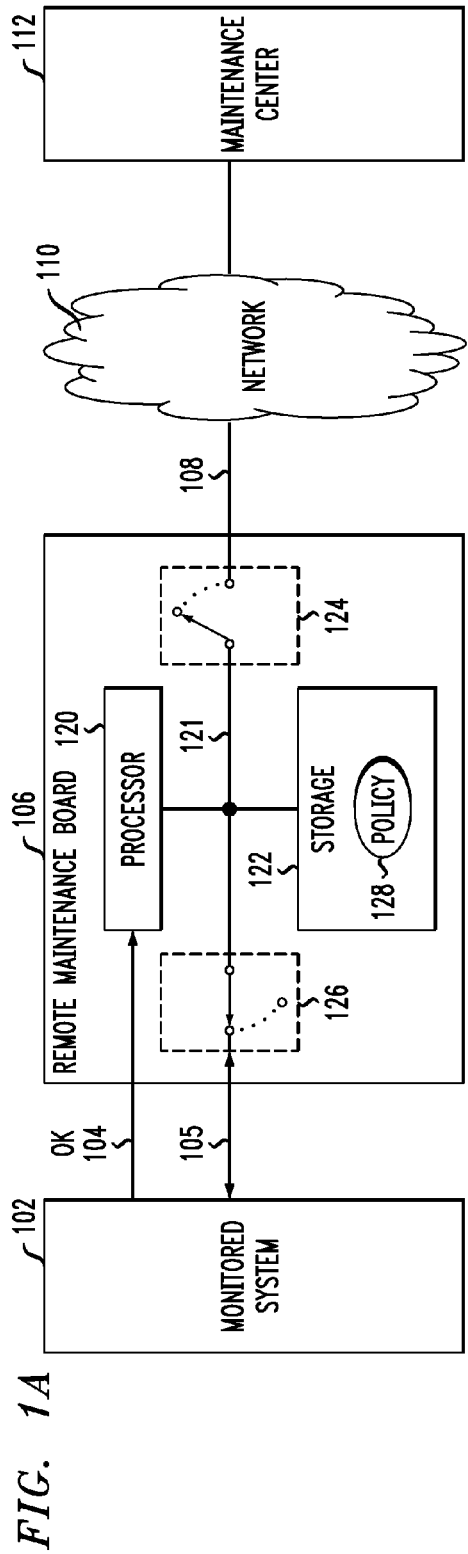
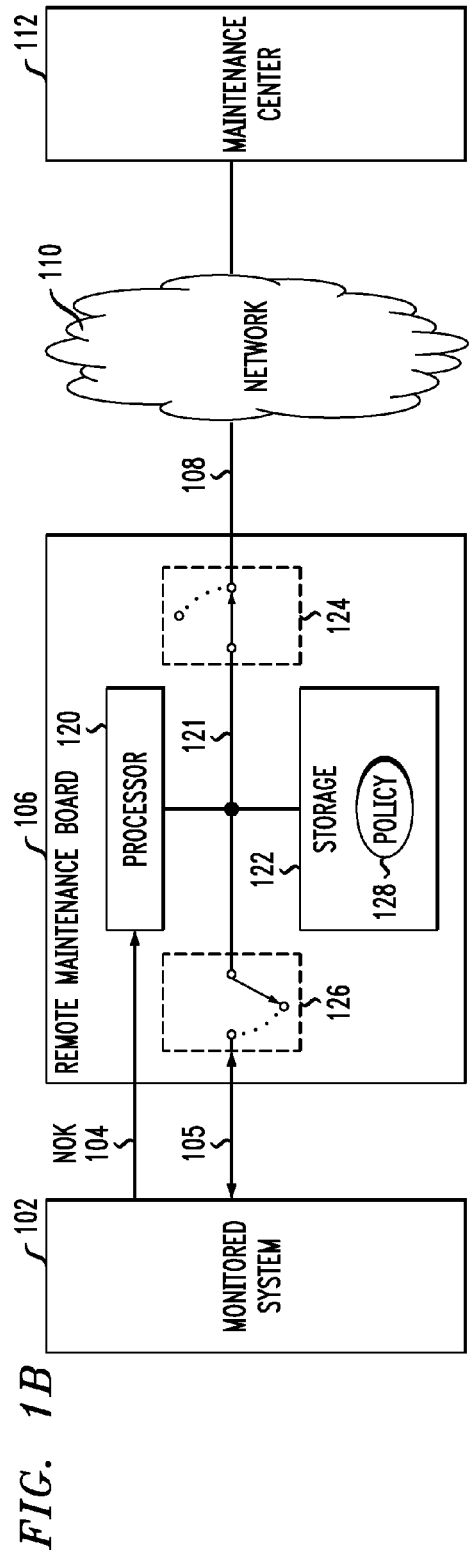

SECURE REMOTE ACCESS

TECHNICAL FIELD

This invention relates generally to communications and specifically to secure remote communications access.

BACKGROUND OF THE INVENTION

Remote maintenance of equipment involves a maintenance service provider having communications access to a customer's equipment for purposes of receiving equipment alarms, diagnosing errors and faults on the equipment, and repairing or upgrading the equipment. But maintenance paths can also be hacked to provide unauthorized access to the equipment for nefarious purposes. Remote maintenance is common for telecommunications and computing equipment. Such equipment often contains sensitive information. Customers therefore have security concerns about keeping maintenance paths open to such equipment. Financial businesses and governments are especially sensitive to maintenance access points and their vulnerabilities to unauthorized access. Some customers will even forsake remote maintenance for the sake of security. There is therefore a need to balance providing of access for maintenance purposes with security considerations.

The common practice of protecting maintenance access paths is via logins and passwords. But repeated hacking may eventually discover the logins and passwords. Other authentication techniques involve controls such as privilege, time-of-day locks, and biometrics. Widely-used access control technologies include firewalls and Demilitarized Zones (DMZs). Recently, challenge-and-response techniques that use secret keys (e.g., RSA SecurID®) have begun to be used. While more secure than logins and passwords, these techniques do not change the fact that a data path to the customer's equipment is being kept open, and hence is open to attack.

SUMMARY OF THE INVENTION

This invention is directed to solving these and other problems and disadvantages of the prior art. According to an aspect of the invention, a first entity, e.g., a remote maintenance board, interfaces a second entity, e.g., a monitored system, with a communications medium, e.g., a communications network connected to a remote maintenance center. In response to a first state, e.g., OK, of the second entity, the first entity is connected to the second entity and at a same time is disconnected from the communications medium, to prevent the communications medium from communicating with the second entity. In response to a second state, e.g., not OK, of the second entity, the first entity is connected to the communications medium and at the same time is disconnected from the second entity, again to prevent the communications medium from communicating with the second entity. Consequently, the communications medium never has a direct communications connection to the second entity, and this isolation protects the second entity from being accessed in an unauthorized manner from the communications medium, e.g., by hackers.

The invention may be implemented both as a method and an apparatus, as well as a computer-readable medium containing instructions which, when executed by a computer, cause the computer to perform the method.

BRIEF DESCRIPTION OF THE DRAWING

These and other features and advantages of the invention will become more apparent from considering the following description of an illustrative embodiment of the invention together with the drawing, in which:

FIGS. 1A and 1B are block diagrams of a remote maintenance and diagnostics system that includes an illustrative embodiment of the invention.

DETAILED DESCRIPTION

Figure 2:
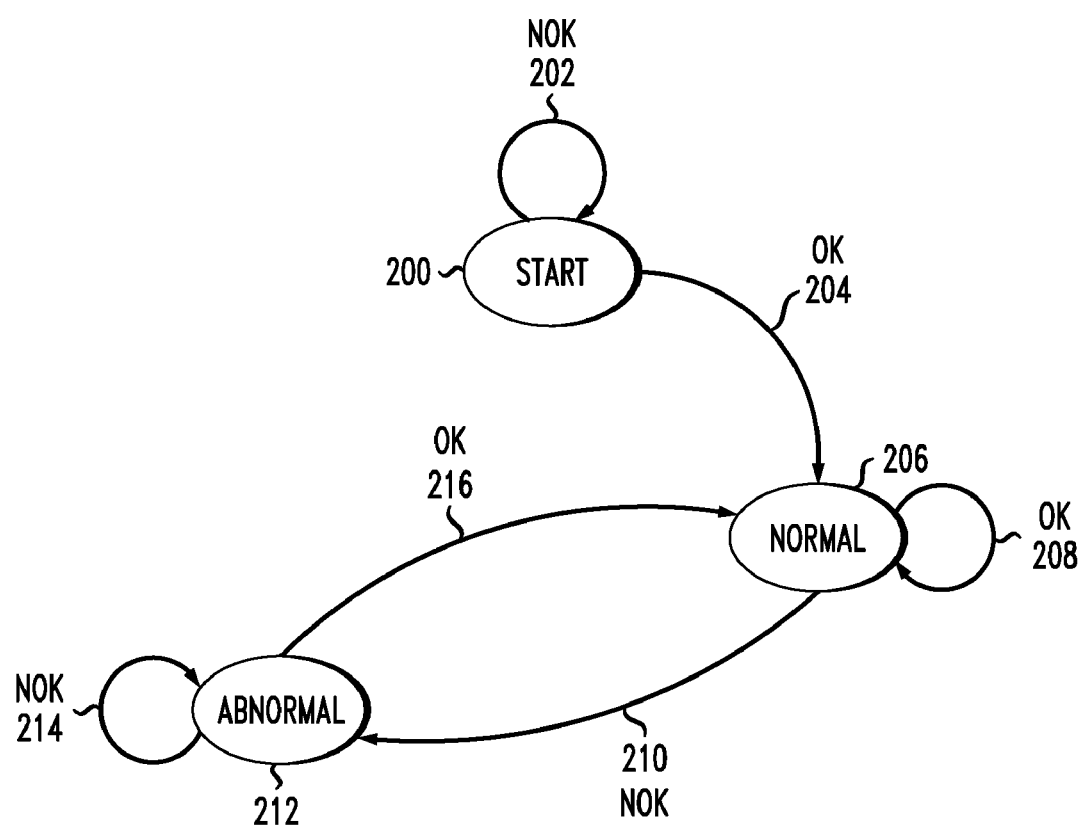
FIG. 2 is a state diagram of a remote maintenance board of the system of FIG. 1.

FIGS. 1A and 1B show a remote maintenance and diagnostics system wherein a remote maintenance center 112 services an entity such as a monitored system 102 remotely through a communications network 110. The nature, type, or construction of system 102, network 110, and center 112 are irrelevant for purposes of this discussion. Monitored system 102 connects to network 110 through a remote (from the viewpoint of center 112) maintenance board (RMB) 106. A communications link 108 connects network 110 to RMB 106, and a communications link 105 connects monitored system 102 to RMB 106. RMB 106 is illustratively a stored-program controlled entity, such as a personal computer, a workstation, a special-purpose computer or a microcontroller, but may also take other forms, such as a state machine, a computer add-on card in monitored system 102, or other electronics. RMB 106 illustratively comprises storage 128 for storing programs and data, a processor 120 for executing the programs, and a communications bus 121 that connects processor 120 to storage 122. Processor 120 under program control performs local maintenance and diagnostics on monitored system 102 over link 105 and stores information about system 102 and its operation in storage 122 for its own use as well as for use by maintenance center 112. As described so far, the system of FIGS. 1A and 1B is conventional.

Connection of monitored system 102 to network 110 creates a vulnerability for monitored system 102 in that it exposes monitored system 102 to potentially being accessed by unauthorized entities in network 110, such as hackers. According to an aspect of the invention, in order to eliminate the possibility of unauthorized access of monitored system 102 from network 110, RMB 106 includes a pair of switching components 124 and 126 that interface bus 121 with links 108 and 105, respectively. Components 124 and 126 act as switches in that they connect bus 121 to, and disconnect bus 121 from, links 105 and 108 selectively under control of processor 120. For this purpose, storage 122 stores a policy 128 which, when executed by processor 120, causes the processor to effect the connections and disconnections between bus 121 and links 105 and 108. Components 105 and 108 may take any desired form. For example, they may comprise gate circuits that act as switches. Illustratively, components 105 and 108 each comprise a transceiver, and processor 120 effects the bus-switching function by selectively enabling and disabling (e.g., turning on and off) the transceivers. Processor 120 of RMB 106 is further connected to monitored system 102 by a signaling link 104. Monitored system 102 sends periodic signals, or "heartbeats", over link 104 to let processor 120 know that it is functional (OK). If monitored system 102 fails to send the heartbeat signals over link 104 for a period of time, this signals processor 120 that monitored system 102 is not functional (NOK). Alternatively, instead of monitored system 102 automatically periodically sending heartbeat signals on link 104, processor 120 may poll system 102 over link 104 for OK signals. In yet another alternative embodiment, link 104 may be dispensed with, and an OK or an NOK indication may be synthesized by processor 120 from information that it obtains from monitored system 102 via link 105. For this purpose, processor 120 would have a separate connection to link 105 that bypasses component 126. In any case, when processor 120 detects that monitored system 102 is not functional (NOK), it notifies maintenance center 112 through network 110 via link 108.

Those operations of RMB 106 that are relevant to an appreciation of the invention will now be described in conjunction with the state diagram of FIG. 2. When RMB 106 is powered up, it initializes itself in a start state 200. In this state, switch 126 is "open" and switch 124 is "closed," whereby link 105 is disconnected from bus 121 and link 108 is connected to bus 121 (as shown in FIG. 1B). RMB 106 is thus connected to network 110, which allows RMB 106 to perform initialization functions such as registering itself with maintenance center 112. Significantly, there is no communication connection between network 110 and monitored system 102 in start state 200; monitored system 102 is isolated from network 110 by bus-switch 126 and therefore is immune to being accessed from network 110. RMB 106 remains (202) in start state 200 if, and while, monitored system 102 is not functional (NOK). When monitored system 102 becomes functional and sends the heartbeat signals on link 104 to indicate that it is OK, RMB 106 transitions (204) to a normal state 206. In normal state 206, switch 126 is "closed" and switch 124 is "open," whereby link 105 is connected to bus 121 and link 108 is disconnected from bus 121, as shown in FIG. 1A. RMB 106 is thus connected to monitored system 102, which allows RMB 106 to perform its normal maintenance and diagnostics functions on monitored system 102. Significantly, there is no communication connection between network 110 and monitored system 102 in normal state 206; monitored system 102 is isolated from network 110 by bus-switch 124 and therefore is immune to being accessed from network 110.

RMB 106 remains (208) in normal state 206 while it continues to receive the heartbeat signals indicating that monitored system 102 is OK. When monitored system 102 becomes dysfunctional and ceases to send the heartbeat signals on link 104, this indicates to RMB 106 that system 102 is NOK. In response, RMB 106 transitions (210) to an abnormal state 212. Abnormal state 212 is much like start state 200 in that switch 126 is "open" and switch 124 is "closed," whereby link 105 is disconnected from bus 121 and link 108 is connected to bus 121, as shown in FIG. 1B. RMB 106 is thus connected to network 110, which allows RMB 106 to inform maintenance center 112 of the failed condition of monitored system 102, to supply gathered data about system 102 to center 112, and to receive instruction from center 112 regarding what needs to be done. Significantly, as in start state 200, system 102 is isolated from network 110 in abnormal state 212 and thus is immune to being accessed from network 110.

RMB 106 remains (214) in abnormal state 212 until it begins to receive the heartbeat signals again from monitored system 102, at which time RMB 106 transitions (216) back to normal state 206.

It should therefore be apparent that at no time is there a communications connection between monitored system 102 and network 110 that could be exploited for unauthorized access of system 102. Security of system 102 is thus ensured.

Of course, various changes and modifications to the illustrative embodiment described above will be apparent to those skilled in the art. For example, RMB 106 may interface to multiple networks and/or monitored systems. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:
   interdisposing a remote maintenance board between a communications medium and a monitored system, wherein the remote maintenance board communicates with a remote maintenance center through the communication medium, and wherein the monitored system has a first state and a second state;
   during the first state, the remote maintenance board receiving a heartbeat signal from the monitored system;
   in response to the first state of the monitored system, the remote maintenance board connecting to the monitored system while receiving the heartbeat signal;
   also in response to the first state of the monitored system and concurrently with the remote maintenance board connecting to the monitored system, the remote maintenance board disconnecting from the communications medium to prevent the communications medium from communicating with the monitored system;
   the remote maintenance board determining that the heartbeat signal is no longer being received;
   in response to determining that the heartbeat signal is no longer being received, the remote maintenance board recognizing the second state, where the second state indicates that the monitored system has malfunctioned:
   in response to the malfunction of the monitored system, the remote maintenance board communicating with the remote maintenance center by connecting to the communications medium while the heartbeat signal is not being received; and
   also in response to the malfunction of the monitored system and concurrently with the remote maintenance board communicating with the remote maintenance center, the remote maintenance board disconnecting from the monitored system to prevent the communications medium from communicating with the monitored system while the heartbeat signal is not being received.

2. The method of claim 1 further comprising:
   while connected to the monitored system, the remote maintenance board communicating with the monitored system; and
   while connected to the communications medium, the remote maintenance board communicating over the communications medium.

3. The method of claim 2 wherein:
   the remote maintenance board communicating with the monitored system comprises:
     the remote maintenance board performing maintenance and diagnostics functions on the monitored system; and
   the remote maintenance board communicating over the communications medium comprises:
     the remote maintenance board communicating with a remote maintenance center to receive maintenance and diagnostics information.

4. The method of claim 1 wherein:
   connecting to the monitored system and at a same time disconnecting from the communications medium comprises:
   closing a first switch to connect a functional element of the remote maintenance board with the monitored system and at a same time opening a second switch to disconnect the functional element of the remote maintenance board from the communications medium; and
   connecting to the communications medium and at a same time disconnecting from the monitored system comprises:

opening the first switch to disconnect the functional element of the remote maintenance board from the monitored system and at a same time closing the second switch to connect the functional element of the remote maintenance board with the communications medium.

5. The method of claim 4 wherein:
closing a first switch and at a same time opening a second switch comprises:
enabling a first transceiver and at a same time disabling a second transceiver; and
opening the first switch and at a same time closing the second switch comprises:
disabling the first transceiver and at a same time enabling the second transceiver.

6. A non-transitory computer-readable storage medium storing instructions which, when executed by the computer, cause the computer to perform the method of one of claims 1-5.

7. An apparatus comprising:
a remote maintenance board for interfacing with a monitored system and with a communications medium, the remote maintenance board comprising:
a memory;
a processor in communication with the memory, the processor is adapted to:
receive a heartbeat signal from the monitored system;
while the heartbeat signal is being received from the monitored system, determine that the monitored system is in a first state;
respond to a first state of the monitored system by connecting to the monitored system and at a same time disconnecting from the communications medium to prevent the communications medium from communicating with the monitored system;
determine that the heartbeat signal is no longer being received;
in response to determining that the heartbeat signal is no longer being received, transition to a second state, where the second state indicates that the monitored system has malfunctioned;
respond to the malfunction of the monitored system by connecting to the communications medium and at a same time disconnecting from the monitored system to prevent the communications medium from communicating with the monitored system, wherein the remote maintenance board communicates with a remote maintenance center through the communications medium while in the second state;
determine that the heartbeat signal is again being received; and respond to receiving the heartbeat signal again by transitioning back to the first state.

8. The apparatus of claim 7 further comprising:
the monitored system in communication with the remote maintenance board; and
the communications medium in communication with the remote maintenance board.

9. The apparatus of claim 7 wherein the remote maintenance board is adapted to:
communicate with the monitored system while connected to the monitored system; and
communicate over the communications medium while connected to the communications medium.

10. The apparatus of claim 7 wherein the remote maintenance board is adapted to:
perform maintenance and diagnostics functions on the monitored system while connected to the monitored system communicate with a remote maintenance and diagnostics entity while connected to the communications medium.

11. The apparatus of claim 7 wherein the remote maintenance board comprises:
a first switch and a second switch;
a functional element; and
the remote maintenance board is adapted to:
close the first switch to connect the functional element with the monitored system and at a same time to open the second switch to disconnect the functional element from the communications medium; and
open the first switch to disconnect the functional element from the monitored system and at a same time to close the second switch to connect the functional element to the communications medium.

12. The apparatus of claim 11 wherein:
the first and the second switch respectively comprise a first and a second transceiver; and
the remote maintenance board is adapted to enable one of the first and the second transceiver and at a same time to disable another of the first and the second transceiver.

13. The apparatus of claim 11 wherein:
the first and the second switch respectively comprise a first and a second bus switch; and
the remote maintenance board further comprises a communications bus for connecting the functional element to the monitored system through the first bus switch and for connecting the functional element to the communications medium through the second bus switch.

\* \* \* \* \*